United States Patent
Matsumae

(10) Patent No.: US 8,054,491 B2
(45) Date of Patent: Nov. 8, 2011

(54) COMMUNICATION APPARATUS THAT PREVENTS THE WASTEFUL PRINTING OF ERROR REPORTS

(75) Inventor: Keisaku Matsumae, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 750 days.

(21) Appl. No.: 12/213,642

(22) Filed: Jun. 23, 2008

(65) Prior Publication Data

US 2009/0002769 A1 Jan. 1, 2009

(30) Foreign Application Priority Data

Jun. 27, 2007 (JP) ................. 2007-168840

(51) Int. Cl.
*H04N 1/00* (2006.01)
(52) U.S. Cl. ..................................... 358/1.15
(58) Field of Classification Search .................. 358/1.15
See application file for complete search history.

(56) References Cited

U.S. PATENT DOCUMENTS

| | | | |
|---|---|---|---|
| 2006/0222352 A1* | 10/2006 | Kawase et al. | 396/15 |
| 2007/0076244 A1* | 4/2007 | Suzuki et al. | 358/1.15 |
| 2008/0278751 A1* | 11/2008 | Moyer et al. | 358/1.15 |

FOREIGN PATENT DOCUMENTS

| | | |
|---|---|---|
| JP | 2002-232625 | 8/2002 |
| JP | 2006-333265 | 12/2006 |

* cited by examiner

*Primary Examiner* — Benny Tieu
*Assistant Examiner* — Qian Yang
(74) *Attorney, Agent, or Firm* — Wenderoth, Lind & Ponack, L.L.P.

(57) ABSTRACT

A communication apparatus preventing output of wasteful error reports is provided. To this end, first, the communication apparatus comprises a display means displaying an error report regarding a communication error and a print means printing an error report regarding a communication error. The communication apparatus further comprises a control means allowing the display means to display an error report regarding a communication error in the case the occurrence of the communication error is detected while the user is authenticated by an authentication means. The control means allows the print means to print an error report regarding a communication error where the occurrence of a communication error is detected and when the user is not authenticated by the authentication means.

10 Claims, 8 Drawing Sheets

Fig. 6

| Job No. | Function name | Destination | User ID |
|---|---|---|---|
| 85 | e-mail transmission | tatituteto@nuneno.sasi | AB001 |
| 86 | e-mail transmission | aiueo@kukeko.sasi | AB002 |
| 87 | Facsimile transmission | 0123456789123 | AB002 |
| 88 | PC transmission | 123.456.7.8 | AB005 |
| 88 | PC transmission | 987.654.3.2 | AB005 |
| 90 | Facsimile transmission | 0987654321987 | AB002 |
| 91 | Facsimile transmission | 0123456789123 | AB002 |

601 — Job No.
602 — Function name
600
603 — Destination
604 — User ID

Fig. 8

<Error Report>

801 —— Name : User A
802 —— User ID : AB002

Error code : X02101

Job No. : 91

Error name : impossible transmission

Date and time : June 12, 2007, 13:30

Error description : unable to connect to the destination

Destination : 0123456789123

Resolution means : Check the destination telephone number once again and retry.

803

COMMUNICATION APPARATUS THAT PREVENTS THE WASTEFUL PRINTING OF ERROR REPORTS

BACKGROUND OF THE INVENTION

1. Field of the Invention

The present invention relates to a communication apparatus and more specifically to a communication apparatus preventing output of wasteful error reports.

2. Description of the Related Art

Communication apparatuses, such as facsimile machines, image-forming apparatuses, and multifunction apparatus having communication functions, have a communication function to print an error report on which the occurrence of a communication error is referred when a communication error occurs, for example, after the facsimile transmission function as the communication function is executed. A variety of communication errors occur depending on the communication function. For example, in considering the communication errors sustained by each communication function, the facsimile transmission function may sustain a communication error such as line connection failure. Such a communication error occurs when a telephone number given as the telephone number of the other party does not exist or when there is no answer a specific period of time after the communication function is launched.

The e-mail transmission function, which is another communication function, may sustain a communication error such as an e-mail message transmission failure. For example, it is assumed that a user has sent an e-mail message with image data attached to an SMTP (simple-mail transfer protocol) server. The SMTP server reads and searches the destination e-mail address. The above communication error occurs when the destination e-mail address does not exist.

The personal computer (PC) transmission function may sustain a communication error such as failure of image data transmission to a PC. Such a communication error occurs when the user transmits image data to a specific PC and the IP address of the PC does not exist or the communication cable is disconnected.

When the above communication errors occur, the user sees an error report regarding the communication error, enabling the user to recognize the occurrence of the communication error.

However, the above communication apparatuses print an error report even if the user recognizes the occurrence of a communication error, irritating the user and paper and toner is wastefully used for printing the error report.

Particularly, as for the communication functions such as e-mail transmission function and PC transmission function in which the occurrence of a communication error is relatively quickly detected, the user often recognizes the communication error and, in which case, the error reports are excessively wasteful.

In order to resolve the above problem, for example, Japanese Laid-Open Patent Application Publication No. 2002-232625 discloses a communication apparatus having a display part displaying error messages and a printer printing image information. The communication apparatus further comprises an error identification means identifying the nature of an error when an error occurs, an error information storage means storing the error identification result, and an error information output means selecting and outputting only the specified error nature information among the information stored in the error information storage means. With this arrangement, the user is efficiently made aware only of error information in which the user has an interest. The user is not irritated and output of wasteful error reports is prevented.

Japanese Laid-Open Patent Application Publication No. 2006-333265 discloses a communication apparatus comprising a communication means communicating with other devices, an error detection means detecting the occurrence of a communication error in the communication, and an acknowledgment detection means detecting the user acknowledgement of the occurrence of the communication error. The communication apparatus further comprises a print time storage means storing the print time for printing an error report and a print means printing an error report on the communication having a communication error when the acknowledgment is not detected within the print time since the communication error is detected. With this arrangement, when the user has acknowledged the communication error occurrence, no error report is printed, preventing, as in the above case, irritation to the user and the output of wasteful error reports.

SUMMARY OF THE INVENTION

The technique described in Japanese Laid-Open Patent Application Publication No. 2002-232625 outputs specified error nature information. However, it is not known who has performed the transmission function having the error. Therefore, though the error is resolved on the scene, the user who is responsible for the error may not acknowledge the error, and the user may repeat the error. For example, the user may repeatedly execute the facsimile transmission function to another party at a non-existing telephone number. The user who is responsible for the error does not have a chance to recognize the error and repeats the same error. In such a case, an error report is needlessly repeatedly printed each time based on the error.

The technique described in Japanese Laid-Open Patent Application Publication No. 2006-333265 allows anyone to recognize communication errors, and someone other than the user who has executed the transmission function can acknowledge the error and prevent the error report printing. As in the above case, the user who is responsible for the communication error does not have a chance to recognize the communication error and may repeat the same communication error.

Even if the error report is printed, it is not known who has performed the transmission function for which the error report is printed, making it difficult to identify the user who is responsible for the communication error and the printed error report is wasted.

The present invention is proposed to resolve the above problems and provides a communication apparatus preventing output of wasteful error reports.

In order to resolve the above problems and achieve the above purpose, the communication apparatus of the present invention comprises a user identification information acquisition means acquiring user identification information that can uniquely identify the user, an authentication means authenticating the user based on the user identification information, and a communication means communicating with other devices. The communication apparatus further comprises an error detection means detecting the occurrence of a communication error in the communication, a display means displaying an error report regarding the communication error, and a print means printing an error report regarding the communication error.

The communication apparatus further comprises a control means not allowing the print means to print an error report regarding a communication error that has occurred and allowing the display means to display an error report regarding the communication error in the case that the error detection means detects the occurrence of the communication error while the user is authenticated by the authentication means.

The control means does not allow the display means to display an error report regarding a communication error that has occurred and allows the print means to print an error report regarding the communication error in the case that the error detection means detects the occurrence of the communication error while the user is not authenticated by the authentication means.

The communication apparatus further comprises a function-user storage means associating and storing the user identification information of a user who has executed a function and the function and a comparison means comparing the user identification information of an authenticated user and the user identification information associated with the function corresponding to the communication error based on the function-user storage means. The control means does not allow the print means to print an error report regarding a communication error that has occurred and allows the display means to display an error report regarding the communication error in the case that the error detection means detects the occurrence of the communication error while a user is authenticated by the authentication means and the user identification information of the authenticated user matches the user identification information associated with the function corresponding to the detected communication error.

Furthermore, the control means may not allow the display means to display an error report regarding a communication error that has occurred and allows the print means to print an error report regarding the communication error in the case that the error detection means detects the occurrence of the communication error while a user is authenticated by the authentication means and the user identification information of the authenticated user does not match the user identification information associated with the function corresponding to the detected communication error.

The display means displays the obtained user identification information on the displayed error report.

The print means prints the obtained user identification information on the printed error report.

According to the image forming apparatus of the present invention, in the case that a communication error is detected while the user is authenticated, the control means does not allow an error report regarding the communication error to be printed, but allows an error report regarding the communication error to be displayed. On the other hand, in the case that a communication error is detected while the user is not authenticated, the control means does not allow an error report regarding the communication error to be displayed, but allows an error report regarding the communication error to be printed.

Thus, when the user is authenticated and a communication error occurs in the communication executed by him/her, an error report regarding the communication error is displayed and the user can acknowledge the communication error displayed on the scene. Furthermore, no error report regarding the communication error is printed. No printed error report annoys the user and no paper and toner is wasted for printing the error report.

When the user is not authenticated and the communication error occurs, no error report regarding the communication error is displayed and an error report regarding the communication error is printed. Therefore, if the user does not stay by the communication apparatus when the error report is printed, the user can acknowledge the communication error later by the printed error report. Consequently, the printed error report is not wasted.

Alternatively, the control means displays an error report regarding the communication error when the user identification information of the authenticated user matches the user identification information corresponding to the communication error that has occurred.

In this way, when a communication error occurs in the communication executed by a user other than the authenticated user, no error report regarding the communication error is displayed. When a communication error occurs in the communication executed by the authenticated user, an error report regarding the communication error is displayed. Thus, the operation of the authenticated user is not interrupted by display of an error report corresponding to a user other than the authenticated user. Furthermore, the authenticated user can certainly acknowledge the communication error by display of an error report corresponding to the authenticated user.

The control means prints an error report regarding the communication error when the user identification information of the authenticated user does not match the user identification information corresponding to the communication error that has occurred.

In this way, when a communication error occurs in the communication executed by the authenticated user, no error report regarding the communication error is printed. When a communication error occurs in the communication executed by a user other than the authenticated user, an error report regarding the communication error is printed. Thus, a user other than the authenticated user is informed of the corresponding communication error without interrupting the operation of the authenticated user. Consequently, the communication apparatus is smoothly used and the authenticated user is not oblivious of the communication error corresponding to the user other than the authenticated user. As a matter of course, the printed error report is not wasted.

When the error report is displayed or printed, the user identification information of the user who has executed the communication function is displayed or printed.

In this way, if someone other than the user who has executed the communication function acknowledges the error report, he/she can identify the user who is responsible for the communication error. Thus, the user who is responsible for the communication error can certainly acknowledge the communication error. Consequently, the same communication error is prevented from being repeated by the user because he/she does not know the occurrence of the communication error. The error report created from the communication error is not wasted.

BRIEF DESCRIPTION OF THE DRAWINGS

FIG. 6 is an illustration showing the function-user execution table of the embodiment.

FIG. 8 is an illustration showing an exemplary error report of this embodiment.

DETAILED DESCRIPTION OF PREFERRED EMBODIMENT

An embodiment of the present invention is described hereafter with reference to the attached drawings for understanding the present invention. The following embodiment is an embodiment of the present invention and does not confine the technical scope of the present invention. An alphabet "S" prefixed to the numbers in the flowchart indicates "step."

Figure 1:
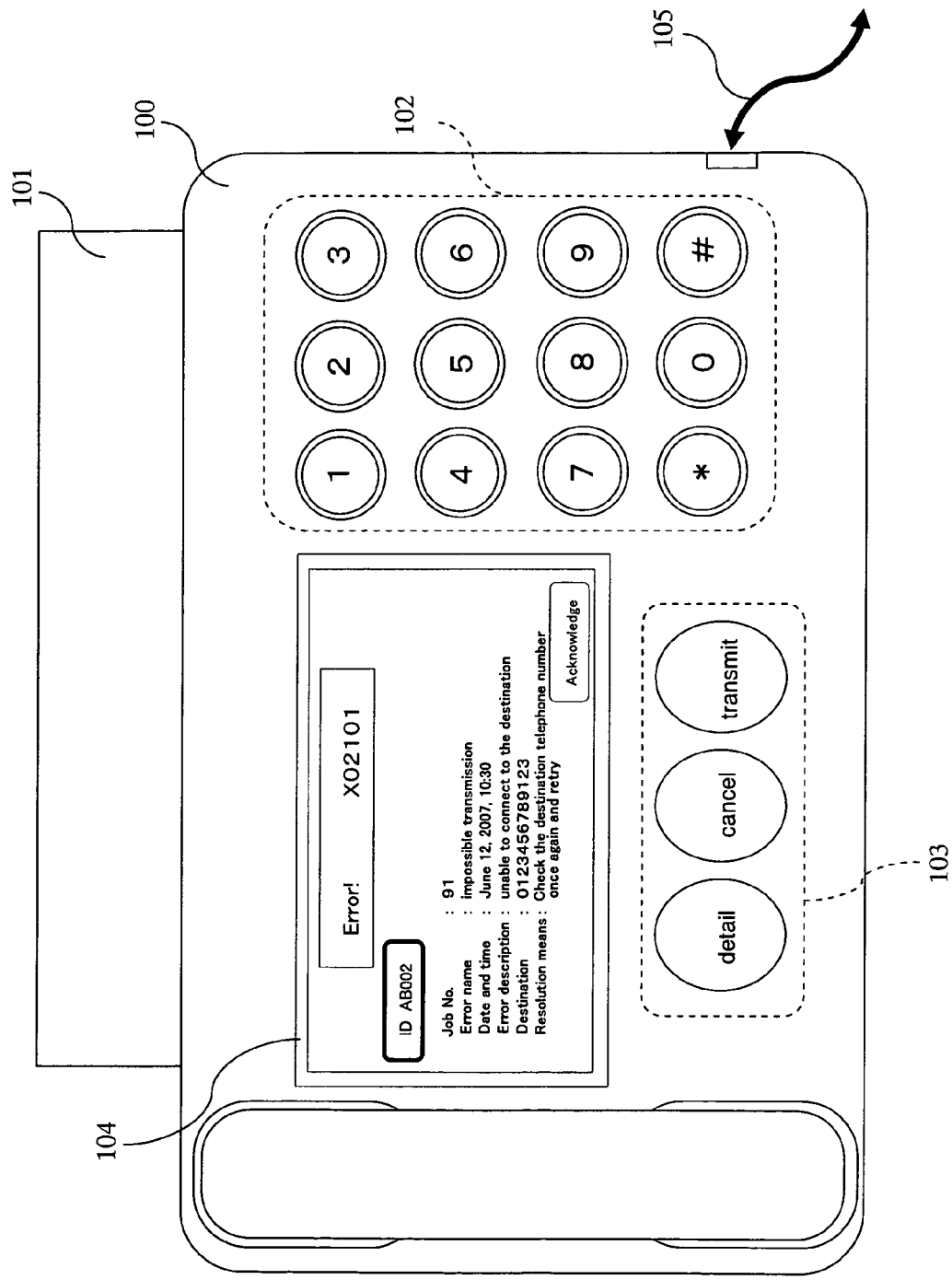
FIG. 1 is an illustration showing the appearance of a facsimile machine of the embodiment.

FIG. 1 is a front appearance of a communication apparatus showing the overall structure thereof. More specifically, the communication device is a facsimile machine 100 capable of communicating with other devices. The facsimile machine 100 comprises a document tray 101, numeric keys 102, function keys 103, a touch panel 104, and a communication cable 105.

Documents to be transmitted are placed on the document tray 101. The numeric keys 102 are used to enter a telephone number (facsimile number) of the other party. The function keys 103 include a transmission key, a cancel key, and a detail key. The transmission key is pressed to start reading the document and transmitting image data of the read document. The cancel key is pressed to cancel the transmission.

The touch panel 104 displays an authentication screen, a transmission setting screen regarding the transmission function, and a communication error screen. The authentication and other screens to be displayed will be described in detail later. The communication cable 105 is used to transmit/receive data such as image data.

The numeric keys 102, function keys 103, and touch panel 104 are collectively termed the operation part.

The facsimile machine 100 comprises drive parts therein, such as an image reading part, an image forming part, and a communication part. The image reading part reads the document placed on the document tray 101 and converts it to image data when the transmission key is pressed. The image forming part forms on sheets images of image data transmitted from other devices and error reports regarding communication errors that have occurred. The communication part transmits/receives data via the communication cable 105 upon communication with other devices.

The above error reports comprise an information medium on which information regarding the communication errors that have occurred is provided, including printed error reports and displayed error reports. The communication error screen is also an information medium on which information regarding communication errors is provided. The communication error screen is also referred to as an error report.

The drive parts work cooperatively to provide the communication function to the user. The communication function provided here includes facsimile transmission/reception, e-mail transmission/reception, and PC transmission/reception functions.

The facsimile transmission/reception function is a communication function to transmit image data of the read document to a facsimile number or receive image data from the other party. The e-mail transmission/reception function is a communication function to transmit image data of the read document to an e-mail address or receive image data from the other party. The PC transmission/reception function is a communication function to transmit the image data to a personal computer (PC) connected or receive image data from the other party. The communication functions the user can execute include the facsimile transmission function to transmit image data to a destination specified by a facsimile number, e-mail transmission function to transmit an e-mail message with image data attached to a destination specified by an e-mail address, and PC transmission function to transmit image data to a destination PC specified by an IP address.

Here, the communication means exchanging of information with devices other than the communication apparatus the user operates.

Among the above drive parts, a drive part to realize the document reading is termed an image reading means, a drive part to realize the image formation is termed a print means, and a drive part to realize the communication is termed a communication means.

The screens displayed on the touch panel 104 will be described hereafter with reference to FIGS. 2A, 2B, 3A and 3B.

Figure 2A:
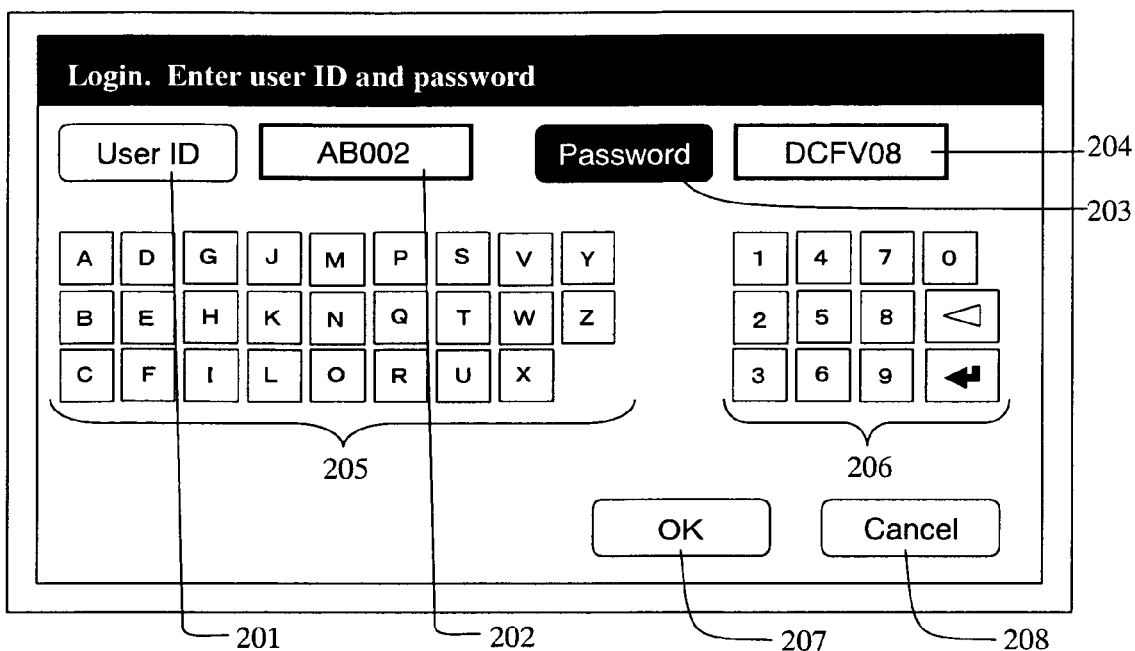
FIGS. 2A and 2B are illustrations showing a screen displayed on the touch panel of the embodiment.

FIG. 2A shows the authentication screen. The authentication screen has a USER ID field 201, a user ID entry 202, a PASSWORD field 203, a password entry 204, alphabet keys 205, numeric keys 206, an OK field 207, and a CANCEL field 208.

When the USER ID field 201 or PASSWORD field 203 is pressed, it is allowed to type in characters in the user ID entry 202 and password entry 204.

Alphabet keys 205 and numeric keys 206 are pressed in combination to enter characters. When the OK field 207 is pressed, the entered characters are acquired by a user identification information acquisition means (which will be described later). When the CANCEL field 208 is pressed, the entered characters are cleared.

Figure 2B:
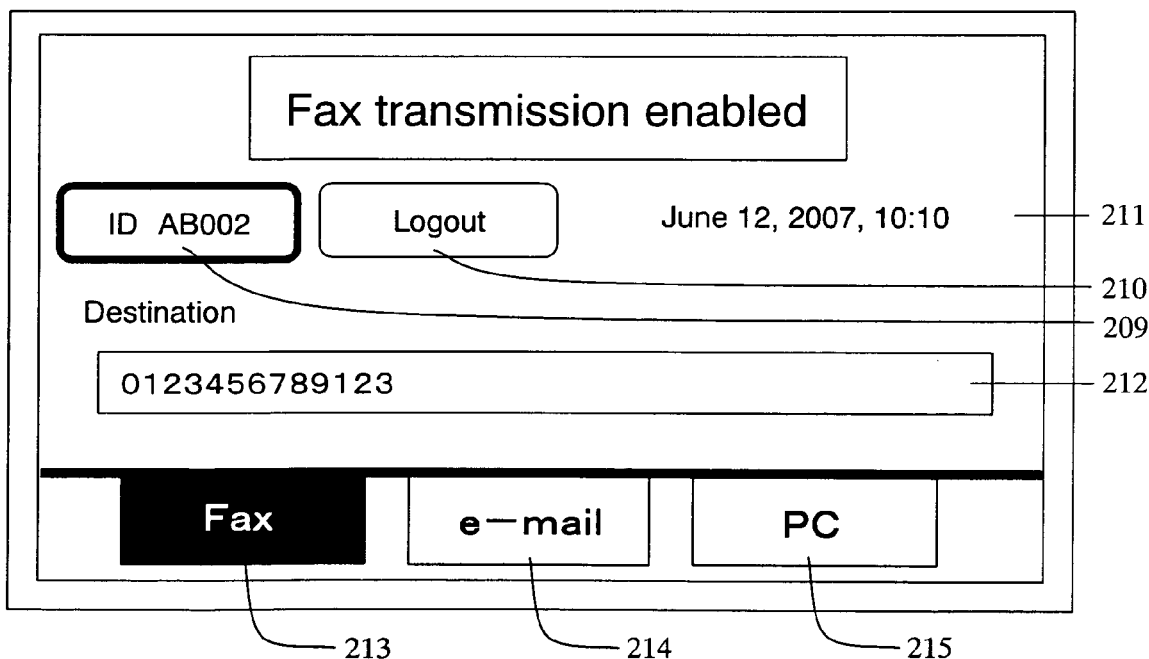

FIG. 2B shows the facsimile transmission setting screen that is a transmission setting screen regarding the facsimile transmission function. The facsimile transmission setting screen displays a login user ID display 209, a LOGOUT field 210, current date and time 211, a transmission destination 212, a "FAX" button 213, an "e-mail" button 214, and a "PC" button 215.

The current login user ID is displayed in the login user ID display 209. For example, the current login user ID "IDAB002" is displayed in FIG. 2B. When the LOGOUT field 210 is pressed, the user authentication is terminated and the above authentication screen appears (FIG. 2A). The entered facsimile number is displayed in the transmission destination 212.

The "FAX" button 213 and others correspond to the transmission setting screens regarding the respective communication functions. For example, when the "FAX" button 213 is pressed, the transmission setting screen corresponding to the "FAX" button 213, namely the facsimile transmission setting screen, appears.

The "e-mail" button 214 corresponds to the e-mail transmission function and the "PC" button 215 corresponds to the PC transmission function. In order to indicate that the current transmission setting screen is the transmission setting screen corresponding to the facsimile transmission function, the "FAX" button 213 has a different background color than the other fields. For example, the "FAX" button 213 has a black background.

Figure 3A:
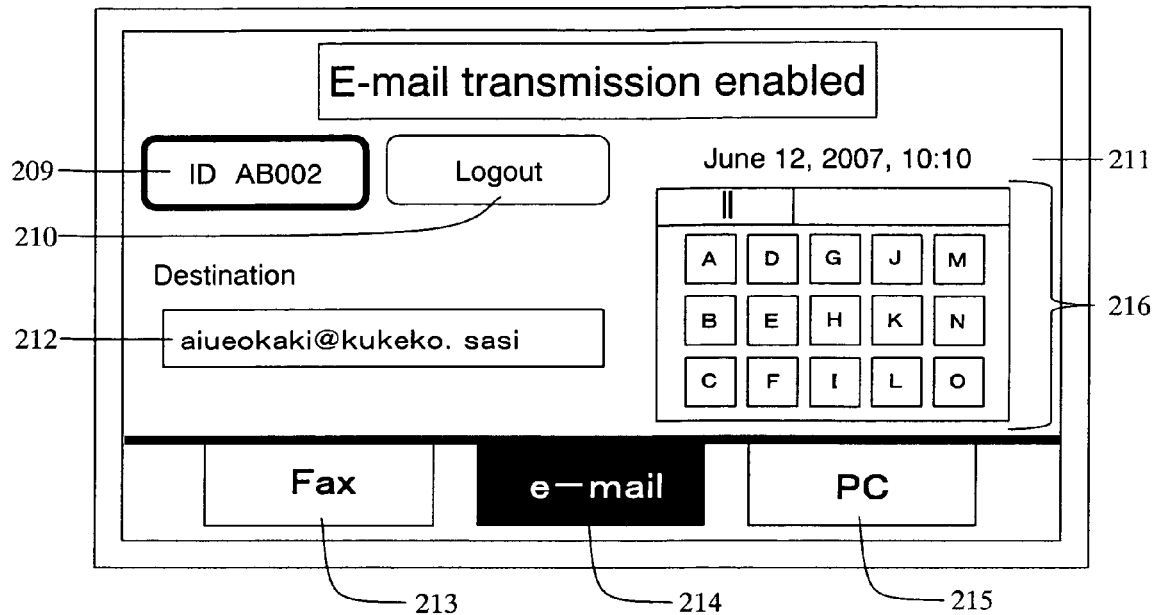
FIGS. 3A and 3B are illustrations showing another screen displayed on the touch panel of the embodiment.

As another transmission setting screen, for example, the e-mail transmission setting screen that is a transmission setting screen corresponding to the "e-mail" button 214 is shown in FIG. 3A. The e-mail transmission setting screen includes alphabet keys 216 in addition to the fields appearing in the facsimile transmission setting screen. The alphabet keys 216 are used to type in an e-mail address of the other party. The alphabet keys 216 also appear in the transmission setting screen corresponding to the "PC" button 215, which is not illustrated.

Figure 3B:
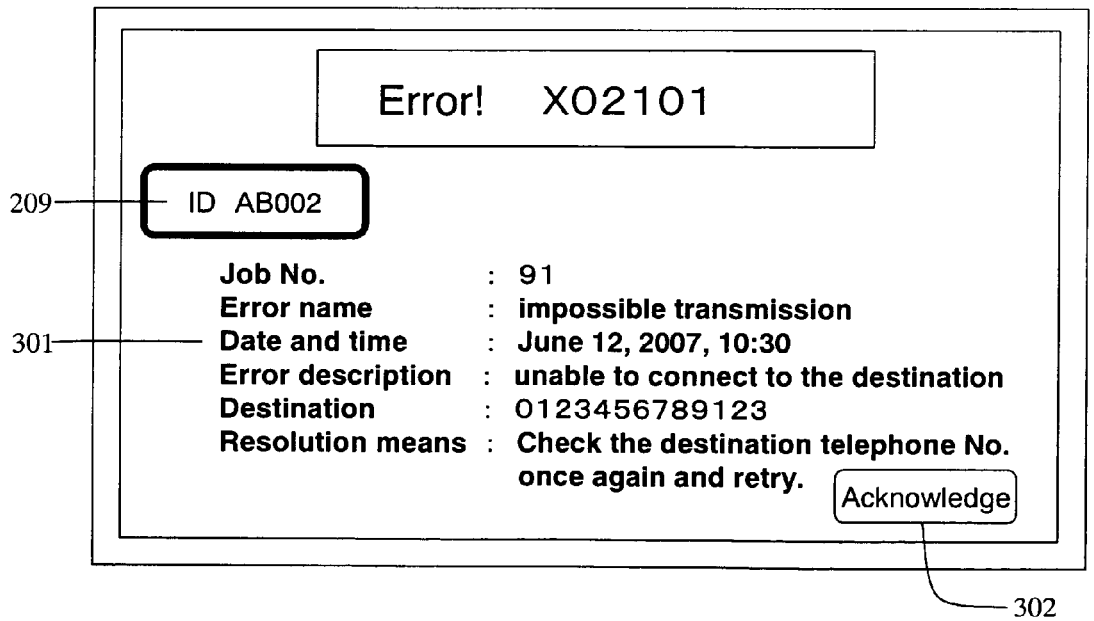

FIG. 3B shows a communication error screen as an error report. The communication error screen displays a login user ID display 209, error details 301, and an acknowledge key 302. Information regarding the communication error (for example, error name, occurrence date and time, error description, transmission destination, and problem resolution means) is displayed in the error details 301. When the acknowledge key is pressed, the facsimile transmission setting screen appears to allow the user to execute the facsimile transmission function once again.

Figure 4:
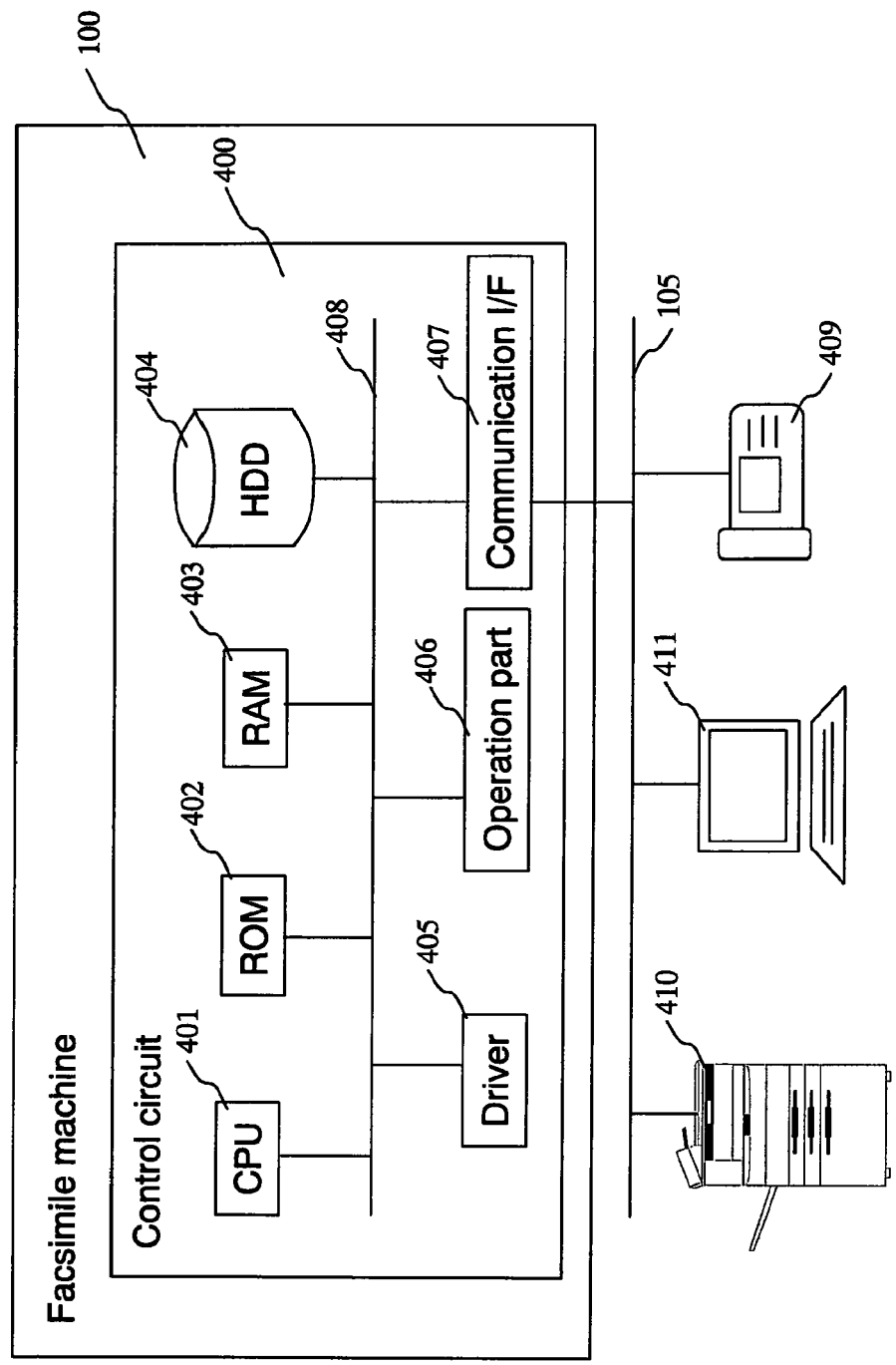
FIG. 4 is a schematic illustration showing the control hardware configuration of the facsimile machine of the embodiment.

The control hardware configuration of the facsimile machine 100 will be described hereafter with reference to FIG. 4. FIG. 4 is a schematic illustration showing the control hardware configuration of the facsimile machine 100. Components not directly relating to the present invention will not be described in detail.

The facsimile machine 100 has a control circuit 400 in which a CPU (central processing unit) 401, an ROM (read only memory) 402, an RAM (random access memory) 403, an HDD (hard disk drive) 404, drivers 405 corresponding to the drive parts, an operation part 406, and a communication interface 407 are connected via an internal bus 408. The CPU 401 uses, for example, the RAM 403 as a working area and executes programs stored in the ROM 402 and HDD 404. The CPU 401 exchanges data and instructions with the drivers 405 based on the execution results, thereby controlling the operation of the drive parts shown in FIG. 1. As for the means (shown in FIG. 5) other than the drive parts and described later, the CPU 401 executes programs and exchanges data and instructions with the operation part 406, thereby realizing the means. Programs and data for realizing the means described below are stored in the ROM 402 and HDD 404. The communication interface 407 connects other device, namely a facsimile machine 409, an image forming apparatus 410, and a PC 411, via a communication cable 105. The CPU 401 exchanges data with the facsimile machine 409, image forming apparatus 410, and PC 411 via the communication interface 407.

Figure 5:
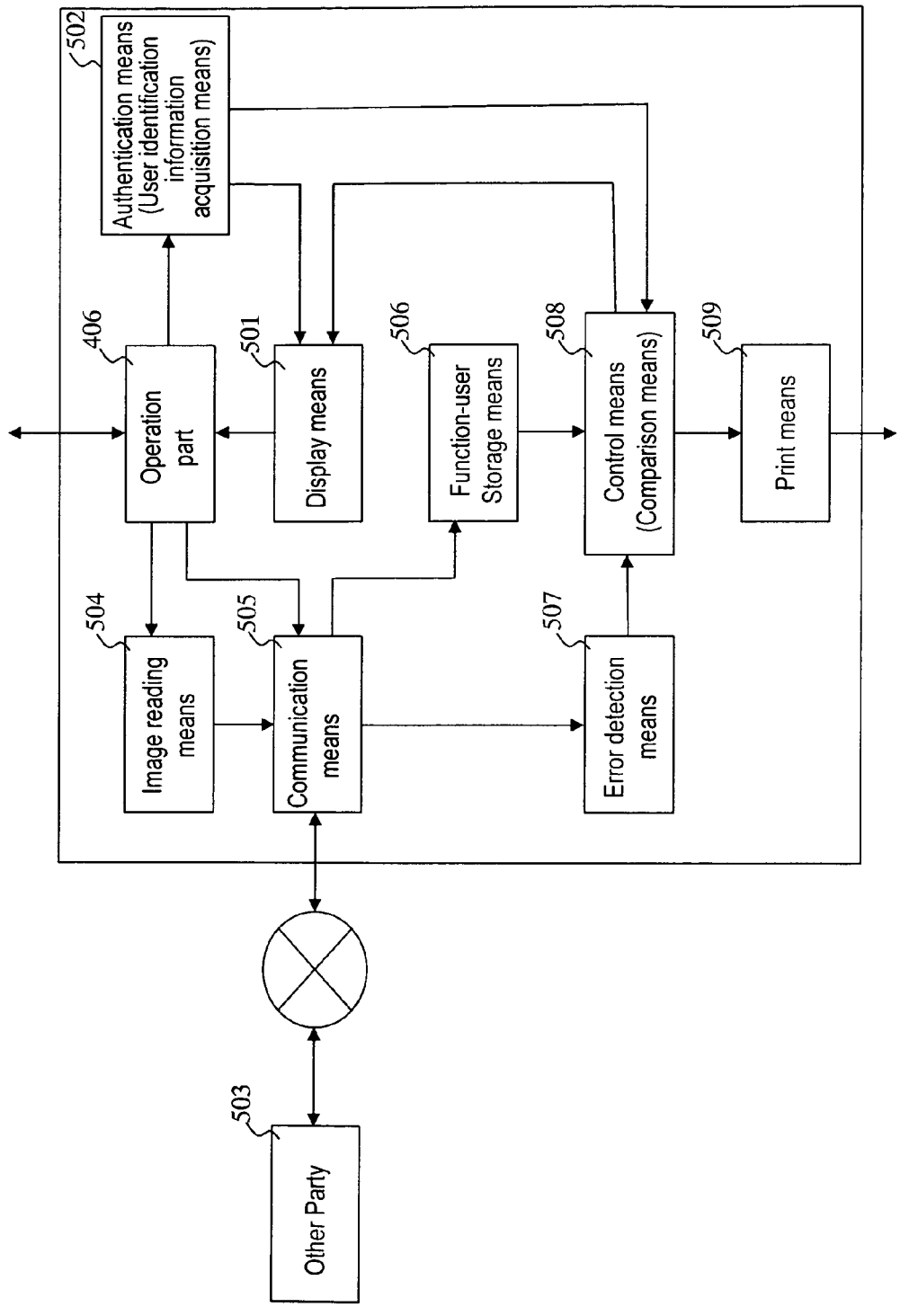
FIG. 5 is a functional block chart of the facsimile machine of the embodiment.
Figure 7:
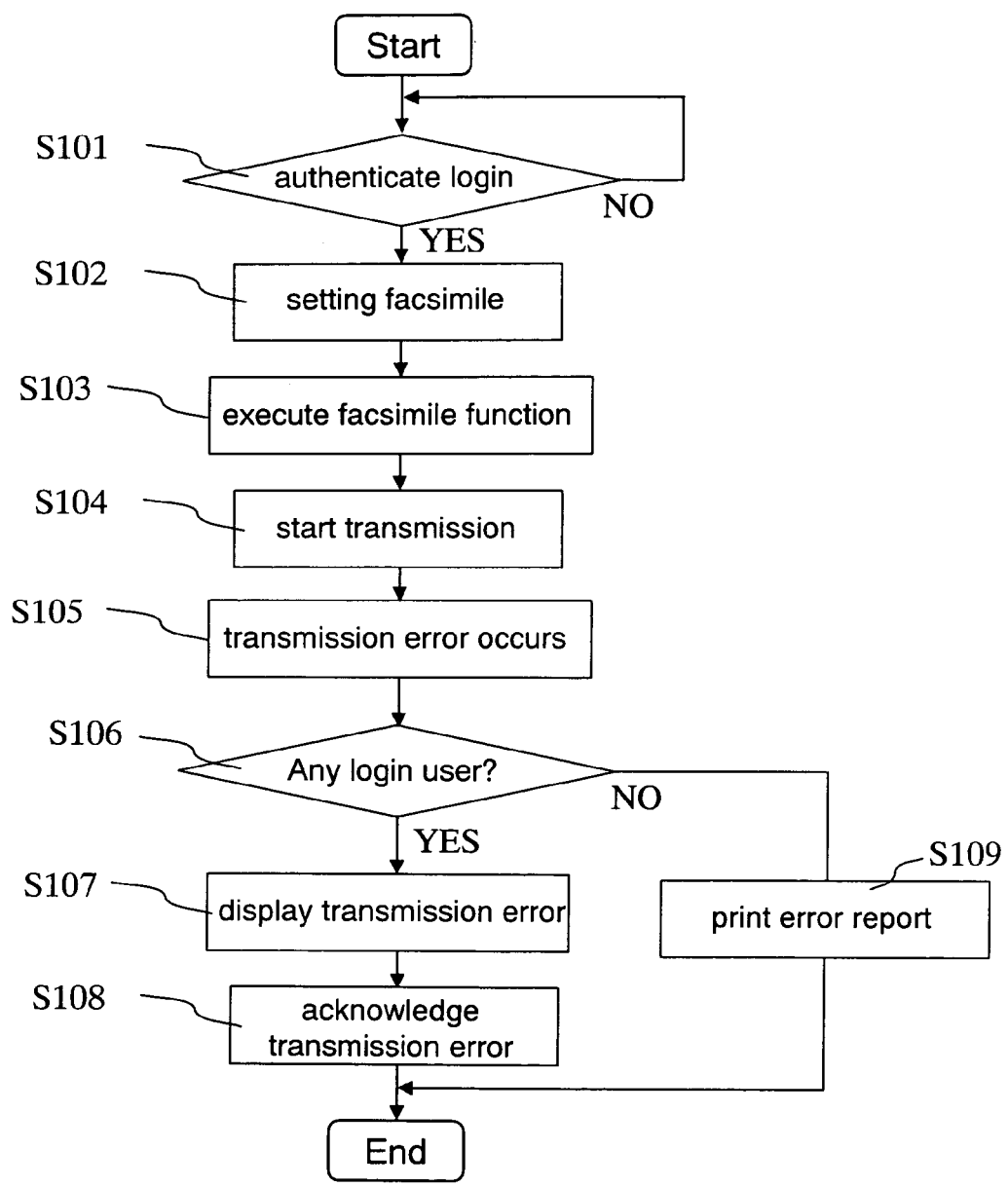
FIG. 7 is a flowchart showing the procedure of the embodiment.

The procedure in the case that the facsimile machine 100 of this embodiment of the present invention detects a communication error will be described hereafter with reference to FIGS. 5 to 8. FIG. 5 is a functional block chart of the facsimile machine of the Embodiment. FIG. 6 is an illustration showing the function-user execution table. FIG. 7 is a flowchart showing the procedure of the embodiment of the present invention. FIG. 8 is an illustration showing an exemplary actual error report.

First, a function-user execution table 600 stored in a function-user storage means (which will be described later) will be described. In the function-user execution table 600, as shown in FIG. 6, a job number 601, a function name 602, a transmission destination 603, and a user ID 604 are associated with one another for each function executed by a user.

The job number 601 stores the serial number of a communication function executed by a user. The function name 602 stores the name of the function executed by the user (facsimile transmission function, e-mail transmission function, and PC transmission function). The transmission destination 603 stores the transmission destination of the communication function executed by the user. The user ID 604 stores the login user ID when the communication function is executed.

The function-user execution table 600 is used to identify the user who has executed the communication function from a communication error that has occurred.

The procedure of the embodiment of the present invention will be described hereafter. A display means 501 displays the authentication screen (FIG. 2A) on the touch panel 104 that is the operation part 406. The user types in his/her own user ID "AB002" and password "DCFV08" to login. Then, the user presses the OK field 207, whereby a user identification information acquisition means 502 acquires the entered "AB002" and "DCFV08."

The user identification information acquisition means 502 serves as the authentication means and determines whether or not the acquired "AB002" and "DCFV08" match the user ID and password previously stored in the above described user ID table (not shown) (FIG. 7: S101). Here, "to match" means that the acquired "AB002" and "DCFV08" are stored in the user ID and password of the user ID table, respectively, and the acquired "AB002" and "DCFV08" are stored in the one-on-one correspondence manner. The authentication means authenticates the user based on the user ID table. When the user is authenticated in this way, the user has "logged in."

When the "AB002" and "DCFV08" do not match the user ID and password stored in the user ID table, the display means 501 displays the authentication screen once again in order to urge the user to type in the correct user ID and password (FIG. 2A, FIG. 7: S101 NO). On the other hand, when they match, the user is authenticated and the display means 501 displays the facsimile transmission setting screen (FIG. 2B, FIG. 7: S101 YES). Now, the user has logged in the facsimile machine 100 and is allowed to use the facsimile machine 100. Meanwhile, the user identification information acquisition means 502 temporarily stores the user ID "AB002" of the user who has logged in.

Then, the user places the document on the document tray 101, types in a facsimile number of another party 503 using the operation part 406, and presses the transmission key in order to execute the facsimile transmission function (FIG. 7: S102→S103). When the transmission key is pressed, an image reading means 504 starts reading the image data of the document (FIG. 7: S104). A communication means 505 detects the entered facsimile number and tries to make line connection to the other party 503 indicated by the facsimile number.

When the communication means 505 starts communication, it transmits information regarding the facsimile transmission function (for example the facsimile number) to a function-user storage means 506. The function-user storage means 506 stores the user ID and information regarding the facsimile transmission function in the function-user execution table 600. For example, the job number "91," function name "facsimile transmission function," transmission destination "0123456789123," and user ID "AB002" are stored in the function-user execution table 600.

After the communication means 505 tries to make line connection and the line connection to the other party 503 is established, the communication means 505 transmits the read image data to the other party 503. Thus, the facsimile transmission function is provided.

On the other hand, when the communication means 505 tries to make line connection a certain number of times and fails to do it, it informs an error detection means 507 accordingly. Informed that the line connection is not established, the error detection means 507 detects the occurrence of a communication error (FIG. 7: S105).

When the occurrence of a communication error is detected, a detection notice is sent to a control means 508. Receiving the detection notice, the control means 508 serves as a comparison means, comparing the user identification information of the authenticated user and the user identification information associated with the communication function corresponding to the communication error based on the function-user execution table 600. More specifically, the control means 508 obtains and compares the authenticated user ID "AB002" and the user identification information associated with the communication function corresponding to the detected communication error. Here, referring to the function user execution table 600, the control means 508 finds that the transmission function corresponding to the detected communication error is the facsimile transmission function and the user identification information of the user who has executed the facsimile transmission function is the user ID "AB002."

In the case that the user is authenticated by the authentication means and the error detection means 507 detects a communication error corresponding to the facsimile transmission function executed by the user and that the authenticated user ID "AB002" matches the user ID "AB002" corresponding to the detected communication error, the following procedure is executed. The control means 508 does not send signals to a print means 509, but informs the display means 501 of detection of the communication error (FIG. 7: S106 YES). The control means 508 does not send signals to the print means 509; therefore, the print means 509 does not print an error report regarding the communication error.

Informed of detection of the communication error, the display means 501 displays as an error report the communication error screen showing the authenticated user ID "AB002" and communication error (FIG. 3B, FIG. 7: S107). The communication error screen enables the authenticated user to acknowledge the error report corresponding to the facsimile transmission function executed by the authenticated user on the scene and certainly recognize the communication error. When a communication error occurs to some communication executed by a user other than the authenticated user, no error report regarding the communication error is displayed. Therefore, the operation of the authenticated user is not interrupted by the display of an error report corresponding to a user other than the authenticated user.

Furthermore, though the authenticated user acknowledges the communication error, no error report regarding the communication error is printed. Therefore, the authenticated user is not annoyed by the error report and no paper and toner is wasted for printing the error report.

When the user does not stay by the facsimile machine 100 and a person other than the user finds the communication error screen, the person other than the user can identify the user responsible for the communication error with reference to the user ID "AB002" displayed on the communication error screen. Then, the person other than the user can inform the user responsible for the communication error of the communication error that has occurred. Consequently, the same communication error is prevented from being repeated by the user because he/she does not know the occurrence of the communication error.

Then, the user checks whether or not the entered facsimile number is correct with reference to the error details 301 of the communication error screen and presses the acknowledge key 302. The display means 501 displays the facsimile transmission setting screen once again (FIG. 2B, FIG. 7: S108). Subsequently, the user can type in the facsimile transmission function setting once again to quickly resolve the communication error that has occurred.

On the other hand, when the authentication means terminates the authentication of the user before the communication error occurs, the display means 501 displays the authentication screen (FIG. 3A) and the user identification information acquisition means 502 deletes the temporarily stored user ID "AB002." If the communication error is detected subsequently, the detection notice is sent to the control means 508. Then, the control means 508 compares the authenticated user ID and the user ID "AB002" corresponding to the detected communication error.

Here, the authenticated user ID has been deleted by the user identification information acquisition means 502. Therefore, the control means 508 determines that the authenticated user ID and the user ID "AB002" corresponding to the detected communication error do not match. In such a case, the control means 508 does not send signals to the display means 501, but informs the print means 509 of detection of the communication error (FIG. 7: S106 NO). The control means 508 does not send signals to the display means 501; therefore, the display means 501 does not display the communication error screen. Therefore, no wasteful communication error screen or error report is displayed.

Informed of detection of the communication error, the print means 509 prints an error report 800 on which the description regarding the communication error and the acquired user identification information "AB002" are shown (FIG. 7: S109). More specifically, as shown in FIG. 8, the user name "userA" 801, user ID "AB002" 802, and error details 803 are printed. The error details 803 include information regarding the communication error (for example error name, occurrence date and time, error description, transmission destination, and resolution means). If the user has terminated his/her authentication and does not stay by the facsimile machine 100 when the error report 800 is printed, the error report 800 enables the user to recognize the communication error later.

When the user does not stay by the facsimile machine 100 and a person other than the user finds the error report, the person other than the user can identify the user responsible for the communication error with reference to the user ID "AB002" printed on the error report 800. Then, the person other than the user can inform the user responsible for the communication error of the communication error that has occurred. Consequently, the same communication error is prevented from being repeated by the user because he/she does not know the occurrence of the communication error. If the communication error is not repeated, no wasteful error report is printed.

If another user is authenticated to the facsimile machine 100 after the above user terminated his/her authentication, the following procedure is executed. For example, if a user having the user ID "AB005" that is different from the deleted user ID "AB002" logs in the facsimile machine 100, the user identification information acquisition means 502 temporarily stores the user ID "AB005" of the login user.

If a communication error corresponding to the user ID "AB002" occurs after the above login, the control means 508 compares the restored user ID "AB005" (the user ID of the currently authenticated user) and the user ID "AB002" corresponding to the communication error and finds that they do not match. Therefore, the facsimile machine 100 does not display the communication error screen corresponding to the user ID "AB002" on the touch panel 104, but prints an error report regarding the communication error. Thus, the currently authenticated user is informed of the communication error corresponding to the user ID "AB002" without interrupting the operation of this authenticated user. Consequently, the facsimile machine 100 is smoothly used and the authenticated user is not oblivious of the communication error corresponding to the user ID "AB002." As a manner of course, the printed error report can never be wasted.

Communication errors are detected more quickly in the e-mail transmission function and PC transmission function than in the facsimile transmission function. Therefore, error report printing based on communication errors is significantly prevented. Furthermore, the user is not annoyed by printed error reports.

In general, communication errors are detected slowly in the facsimile transmission function. Therefore, the user often does not stay by the facsimile machine 100 when a communication error is detected. In such a case, if the user identification information is printed on the error report, the user responsible for the communication error can be identified and the error report can be used as a proof of the communication history. In such a case, troubles caused by uncertainty of the transmission to the other party can easily be resolved.

The communication error in the above embodiment is a communication error caused by line connection failure. The communication error can be other communication errors. The efficacy of the present invention can be obtained even if the communication error include, for example, bad line connection, disconnection of line to the other party during the communication, non-existing transmission destination (facsimile number, e-mail address, and the like) of the other party, and malfunctioning communication apparatus.

Furthermore, an alarm sound can be generated when the occurrence of a communication error is displayed or printed. The alarm sound allows anyone near the communication apparatus to easily recognize the communication error.

As described above, the communication apparatus of the present invention is useful in facsimile machines, printers, copy machines, and multifunction apparatus and provides a useful communication apparatus preventing output of wasteful error reports.

What is claimed is:

1. A communication apparatus comprising:
  a user identification information acquisition means acquiring user identification information that can uniquely identify the user;
  an authentication means authenticating the user based on the user identification information;
  a communication means communicating with other devices;
  an error detection means detecting an occurrence of a communication error in the communication;
  a display means displaying an error report regarding the communication error;
  a print means printing an error report regarding the communication error; and
  a control means not allowing the print means to print an error report regarding the communication error that has occurred and allowing the display means to display an error report regarding the communication error in the case that the error detection means detects the occurrence of the communication error while the user is authenticated by the authentication means and allowing the print means to print an error report regarding the communication error in the case that the error detection means detects the occurrence of the communication error while the user is not authenticated by the authentication means.

2. The communication apparatus according to claim 1, wherein the control means does not allow the display means to display an error report regarding a communication error that has occurred and allows the print means to print an error report regarding the communication error in the case that the error detection means detects the occurrence of the communication error while the user is not authenticated by the authentication means.

3. The communication apparatus according to claim 2, further comprising:
  a function-user storage means associating and storing a function and the user identification information of a user who has executed a function and the function; and
  a comparison means comparing the user identification information of an authenticated user and the user identification information associated with the function corresponding to the communication error based on the function-user storage means,
  wherein the control means does not allow the print means to print an error report regarding a communication error that has occurred and allows the display means to display an error report regarding the communication error in the case that the error detection means detects the occurrence of the communication error while a user is authenticated by the authentication means and the user identification information of the authenticated user matches the user identification information associated with the function corresponding to the detected communication error.

4. The communication apparatus according to claim 2, further comprising:
  a function-user storage means associating and storing a function and the user identification information of a user who has executed the function; and
  a comparison means comparing the user identification information of an authenticated user and the user identification information associated with the function corresponding to the communication error based on the function-user storage means,
  wherein the control means does not allow the display means to display an error report regarding a communication error that has occurred and allows the print means to print an error report regarding the communication error in the case that the error detection means detects the occurrence of the communication error while a user is authenticated by the authentication means and the user identification information of the authenticated user does not match the user identification information associated with the function corresponding to the detected communication error.

5. The communication apparatus according to claim 3, wherein the display means displays the obtained user identification information on the displayed error report.

6. The communication apparatus according to claim 3, wherein the print means prints the obtained user identification information on the printed error report.

7. The communication apparatus according to claim 4 wherein the display means displays the obtained user identification information on the displayed error report.

8. The communication apparatus according to claim 4, wherein the print means prints the obtained user identification information on the printed error report.

9. The communication apparatus according to claim 7, wherein the print means prints the obtained user identification information on the printed error report.

10. The communication apparatus according to claim 5, wherein the print means prints the obtained user identification information on the printed error report.

* * * * *